(12) United States Patent
Hussels et al.

(10) Patent No.: US 11,099,917 B2
(45) Date of Patent: Aug. 24, 2021

(54) EFFICIENT STATE MAINTENANCE FOR EXECUTION ENVIRONMENTS IN AN ON-DEMAND CODE EXECUTION SYSTEM

(71) Applicant: Amazon Technologies, Inc., Seattle, WA (US)

(72) Inventors: Hans-Philipp Anton Hussels, North Bend, WA (US); Timothy Allen Wagner, Seattle, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 16/144,905

(22) Filed: Sep. 27, 2018

(65) Prior Publication Data

US 2020/0104198 A1    Apr. 2, 2020

(51) Int. Cl.
*G06F 9/54* (2006.01)
*G06F 9/50* (2006.01)

(52) U.S. Cl.
CPC ............ *G06F 9/546* (2013.01); *G06F 9/5066* (2013.01); *G06F 9/5072* (2013.01); *G06F 9/547* (2013.01)

(58) Field of Classification Search
None
See application file for complete search history.

(56) References Cited

U.S. PATENT DOCUMENTS

| | | |
|---|---|---|
| 4,949,254 A | 8/1990 | Shorter |
| 5,283,888 A | 2/1994 | Dao et al. |
| 5,835,764 A | 11/1998 | Platt et al. |
| 5,970,488 A | 10/1999 | Crowe et al. |
| 5,983,197 A | 11/1999 | Enta |

(Continued)

FOREIGN PATENT DOCUMENTS

| | | |
|---|---|---|
| CA | 2975522 A1 | 8/2016 |
| CN | 1341238 A | 3/2002 |

(Continued)

OTHER PUBLICATIONS

International Search Report and Written Opinion in PCT/US2019/053123 dated Jul. 1, 2020.

(Continued)

*Primary Examiner* — Brian Whipple
(74) *Attorney, Agent, or Firm* — Knobbe, Martens, Olson & Bear, LLP

(57) ABSTRACT

Systems and methods are described for providing maintaining state information during processing of data sets via execution of code on an on-demand code execution system. Rather than requiring that execution environments of such a system to maintain state, an intermediary device is disclosed which retrieves calls to the system from a call queue and iteratively submits the calls to the system. Each call within the queue corresponds to a data item of the data set to be analyzed. As calls are submitted to the system, the intermediary device submits state information within the call reflecting a state of processing the data set. A response to the call includes state information updated based on processing of a data item in the call. Thus, state information is maintained for processing the data set, without requiring persistence of state information within individual execution environments.

21 Claims, 6 Drawing Sheets

(56) References Cited

U.S. PATENT DOCUMENTS

| | | |
|---|---|---|
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,966,495 B2 | 2/2015 | Kulkarni |
| 8,972,980 B2 | 3/2015 | Banga et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,417,918 B2 | 8/2016 | Chin et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |

(56) References Cited

U.S. PATENT DOCUMENTS

| | | |
|---|---|---|
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,623,476 B2 | 4/2020 | Thompson |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0191795 A1 | 10/2003 | Bernardin et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2006/0010440 A1 | 1/2006 | Anderson et al. |
| 2006/0015740 A1 | 1/2006 | Kramer |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0248195 A1 | 11/2006 | Toumura et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |

(56) References Cited

U.S. PATENT DOCUMENTS

| | | |
|---|---|---|
| 2008/0209423 A1 | 8/2008 | Hirai |
| 2008/0244547 A1 | 10/2008 | Wintergerst et al. |
| 2008/0288940 A1 | 11/2008 | Adams et al. |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |

(56) References Cited

U.S. PATENT DOCUMENTS

| | | |
|---|---|---|
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0359093 A1 | 12/2014 | Raju et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324174 A1 | 11/2015 | Bromley et al. |
| 2015/0324182 A1 | 11/2015 | Barros et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |

(56) References Cited

U.S. PATENT DOCUMENTS

| | | |
|---|---|---|
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092251 A1* | 3/2016 | Wagner .............. G06F 9/542 718/1 |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0191420 A1 | 6/2016 | Nagarajan et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0147656 A1 | 5/2017 | Choudhary et al. |
| 2017/0149740 A1 | 5/2017 | Mansour et al. |
| 2017/0161059 A1 | 6/2017 | Wood et al. |
| 2017/0177413 A1 | 6/2017 | Wisniewski et al. |
| 2017/0177854 A1 | 6/2017 | Gligor et al. |
| 2017/0188213 A1 | 6/2017 | Nirantar et al. |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286143 A1 | 10/2017 | Wagner et al. |
| 2017/0286187 A1 | 10/2017 | Chen et al. |
| 2017/0308520 A1 | 10/2017 | Beahan, Jr. et al. |
| 2017/0315163 A1 | 11/2017 | Wang et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0046453 A1 | 2/2018 | Nair et al. |
| 2018/0046482 A1 | 2/2018 | Karve et al. |
| 2018/0060132 A1* | 3/2018 | Maru .............. H04L 29/08135 |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0121245 A1 | 5/2018 | Wagner et al. |
| 2018/0121665 A1 | 5/2018 | Anderson et al. |
| 2018/0129684 A1 | 5/2018 | Wilson et al. |
| 2018/0143865 A1 | 5/2018 | Wagner et al. |
| 2018/0150339 A1 | 5/2018 | Pan et al. |
| 2018/0192101 A1 | 7/2018 | Bilobrov |
| 2018/0225096 A1 | 8/2018 | Mishra et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0309819 A1 | 10/2018 | Thompson |
| 2018/0314845 A1 | 11/2018 | Anderson et al. |
| 2018/0341504 A1 | 11/2018 | Kissell |
| 2019/0004866 A1 | 1/2019 | Du et al. |
| 2019/0028552 A1 | 1/2019 | Johnson, II et al. |
| 2019/0043231 A1 | 2/2019 | Uzgin et al. |
| 2019/0072529 A1 | 3/2019 | Andrawes et al. |
| 2019/0079751 A1 | 3/2019 | Foskett et al. |
| 2019/0102231 A1 | 4/2019 | Wagner |
| 2019/0108058 A1 | 4/2019 | Wagner et al. |
| 2019/0140831 A1 | 5/2019 | De Lima Junior et al. |
| 2019/0147085 A1 | 5/2019 | Pal et al. |
| 2019/0155629 A1 | 5/2019 | Wagner et al. |
| 2019/0171423 A1 | 6/2019 | Mishra et al. |
| 2019/0171470 A1 | 6/2019 | Wagner |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0227849 A1 | 7/2019 | Wisniewski et al. |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0286475 A1 | 9/2019 | Mani |
| 2019/0303117 A1 | 10/2019 | Kocberber et al. |
| 2019/0318312 A1 | 10/2019 | Foskett et al. |
| 2019/0361802 A1 | 11/2019 | Li et al. |
| 2019/0363885 A1 | 11/2019 | Schiavoni et al. |
| 2019/0384647 A1 | 12/2019 | Reque et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1* | 3/2020 | Perumala .............. G06F 16/2471 |
| 2020/0081745 A1 | 3/2020 | Cybulski et al. |
| 2020/0104378 A1 | 4/2020 | Wagner et al. |
| 2020/0110691 A1 | 4/2020 | Bryant et al. |
| 2020/0120120 A1 | 4/2020 | Cybulski |
| 2020/0167208 A1 | 5/2020 | Floes et al. |
| 2020/0213151 A1 | 7/2020 | Srivatsan et al. |
| 2020/0341799 A1 | 10/2020 | Wagner et al. |
| 2020/0366587 A1 | 11/2020 | White et al. |

(56) References Cited

U.S. PATENT DOCUMENTS

| | | | |
|---|---|---|---|
| 2020/0412707 | A1 | 12/2020 | Siefker et al. |
| 2020/0412720 | A1 | 12/2020 | Siefker et al. |
| 2020/0412825 | A1 | 12/2020 | Siefker et al. |

FOREIGN PATENT DOCUMENTS

| | | | |
|---|---|---|---|
| CN | 101002170 A | | 7/2007 |
| CN | 101345757 A | | 1/2009 |
| CN | 101496005 A | | 7/2009 |
| EP | 2663052 A1 | | 11/2013 |
| EP | 3201762 A1 | | 8/2017 |
| EP | 3254434 A1 | | 12/2017 |
| EP | 3201768 B1 | | 12/2019 |
| JP | 2002287974 A | | 10/2002 |
| JP | 2006-107599 A | | 4/2006 |
| JP | 2007-538323 A | | 12/2007 |
| JP | 2010-026562 A | | 2/2010 |
| JP | 2011-065243 A | | 3/2011 |
| JP | 2011-233146 A | | 11/2011 |
| JP | 2011257847 A | | 12/2011 |
| JP | 2013-156996 A | | 8/2013 |
| JP | 2014-525624 A | | 9/2014 |
| JP | 2017-534107 A | | 11/2017 |
| JP | 2017-534967 A | | 11/2017 |
| JP | 2018-503896 A | | 2/2018 |
| JP | 2018-512087 A | | 5/2018 |
| JP | 2018-536213 A | | 12/2018 |
| WO | WO 2008/114454 A1 | | 9/2008 |
| WO | WO 2009/137567 A1 | | 11/2009 |
| WO | WO 2012/039834 A1 | | 3/2012 |
| WO | WO 2012/050772 A1 | | 4/2012 |
| WO | WO 2013/106257 A1 | | 7/2013 |
| WO | WO 2015/078394 A1 | | 6/2015 |
| WO | WO 2015/108539 A1 | | 7/2015 |
| WO | WO 2016/053950 A1 | | 4/2016 |
| WO | WO 2016/053968 A1 | | 4/2016 |
| WO | WO 2016/053973 A1 | | 4/2016 |
| WO | WO 2016/090292 A1 | | 6/2016 |
| WO | WO 2016/126731 A1 | | 8/2016 |
| WO | WO 2016/164633 A1 | | 10/2016 |
| WO | WO 2016/164638 A1 | | 10/2016 |
| WO | WO 2017/059248 A1 | | 4/2017 |
| WO | WO 2017/112526 A1 | | 6/2017 |
| WO | WO2017/172440 A1 | | 10/2017 |
| WO | WO 2017/172440 A1 | | 10/2017 |
| WO | WO 2018/005829 A1 | | 1/2018 |
| WO | WO 2018/098445 A1 | | 5/2018 |
| WO | WO 2020/005764 A1 | | 1/2020 |
| WO | WO 2020/069104 A1 | | 4/2020 |

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].
Adapter Pattern, Wikipedia, https://en.wikipedia.org/w/index.php?title=Adapter_pattern&oldid=654971255, [retrieved May 26, 2016], 6 pages.
Amazon, "AWS Lambda: Developer Guide", Retrieved from the Internet, Jun. 26, 2016, URL : http://docs.aws.amazon.com/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Bhadani et al., Performance evaluation of web servers using central load balancing policy over virtual machines on cloud, Jan. 2010, 4 pages.

CodeChef ADMIN discussion web page, retrieved from https://discuss.codechef.com/t/what-are-the-memory-limit-and-stack-size-on-codechef/14159, 2019.
CodeChef IDE web page, Code, Compile & Run, retrieved from https://www.codechef.com/ide, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Deis, Container, 2014, 1 page.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051 /http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.

(56) References Cited

OTHER PUBLICATIONS

Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL <https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP_status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US2017/023564 dated Jun. 6, 2017.
International Preliminary Report on Patentability in PCT/US2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Bebenita et al., "Trace-Based Compilation in Execution Environments without Interpreters," ACM, Copyright 2010, 10 pages.
Bryan Liston, "Ad Hoc Big Data Processing Made Simple with Serverless Map Reduce", Nov. 4, 2016, Amazon Web Services <https://laws.amazon.com/bl ogs/compute/ad-hoc-big-data-processi ng-made-si mple-with-serverless-mapred uce>.
Fan et al., Online Optimization of VM Deployment in IaaS Cloud, 2012, 6 pages.
Ha et al., A Concurrent Trace-based Just-In-Time Compiler for Single-threaded JavaScript, utexas.edu (Year: 2009).
Huang, Zhe, Danny HK Tsang, and James She. "A virtual machine consolidation framework for mapreduce enabled computing clouds." 2012 24th International Teletraffic Congress (ITC 24). IEEE, 2012. (Year: 2012).
Lagar-Cavilla, H. Andres, et al. "Snowflock: Virtual machine cloning as a first-class cloud primitive." ACM Transactions on Computer Systems (TOCS) 29.1 (2011): 1-45. (Year: 2011).
Search Query Report from IP.com, performed Dec. 2, 2020.
Tange, "GNU Parallel: The Command-Line Power Tool", vol. 36, No. 1, Jan. 1, 1942, pp. 42-47.
Wood, Timothy, et al. "Cloud Net: dynamic pooling of cloud resources by live WAN migration of virtual machines." ACM Sigplan Notices 46.7 (2011): 121-132. (Year: 2011).
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Office Action in Canadian Application No. 2,962,633 dated May 21, 2020.
Extended Search Report in European Application No. 19199402.9 dated Mar. 6, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Indian Application No. 201717013356 dated Jan. 22, 2021.
Office Action in Japanese Application No. 2017-516168 dated Mar. 26, 2018.
Office Action in Indian Application No. 201717019903 dated May 18, 2020.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.

(56) References Cited

OTHER PUBLICATIONS

Office Action in Indian Application No. 201717027369 dated May 21, 2020.
First Examination Report for Indian Application No. 201717034806 dated Jun. 25, 2020.
Office Action in European Application No. 16781265.0 dated Jul. 13, 2020.
Office Action in European Application No. 201817013748 dated Nov. 20, 2020.
Office Action in European Application No. 17743108.7 dated Dec. 22, 2020.
International Search Report and Written Opinion dated Oct. 15, 2019 for International Application No. PCT/US2019/039246 in 16 pages.
International Preliminary Report on Patentability dated Dec. 29, 2020 for International Application No. PCT/US2019/039246 in 8 pages.
International Search Report for Application No. PCT/US2019/038520 dated Aug. 14, 2019.
International Preliminary Report on Patentability for Application No. PCT/US2019/038520 dated Dec. 29, 2020.
International Search Report for Application No. PCT/US2019/065365 dated Mar. 19, 2020.
International Search Report for Application No. PCT/US2020/039996 dated Oct. 8, 2020.
International Preliminary Report on Patentability for Application No. PCT/US2019/053123 dated Mar. 23, 2021.

\* cited by examiner

EFFICIENT STATE MAINTENANCE FOR EXECUTION ENVIRONMENTS IN AN ON-DEMAND CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

One example use of data centers is to process or analyze large data sets, which may be impractical to analyze using a single computing device. Various techniques have been developed to allow for multiple computing devices (or in some instances multiple processors within a single computing device) to process data concurrently. This concurrent data processing is sometimes referred to as "parallelization." One technique for allowing parallelization in processing data sets is the "MapReduce" programming model. This programming model generally requires a centralized "infrastructure" or "framework," which controls execution of two functions by individual computing devices within a set of devices. Execution of the first function, a "map" function, causes multiple devices to process portions (or "chunks") of a full set of raw data to generate a set of intermediate results, such as counts of individual words within a corpus of text. Execution of the second function, a "reduce" function, causes one or more devices to combine multiple sets of intermediate results (from multiple map functions) to produce a set of aggregated results. The reduce functions may be executed multiple times, with each execution further reducing the number of aggregated results, until a single aggregate result record is created. In traditional implementations of the MapReduce programming model, an infrastructure or framework must typically execute continuously to coordinate execution of map and reduce functions until a result is provided.

DETAILED DESCRIPTION

Figure 1:
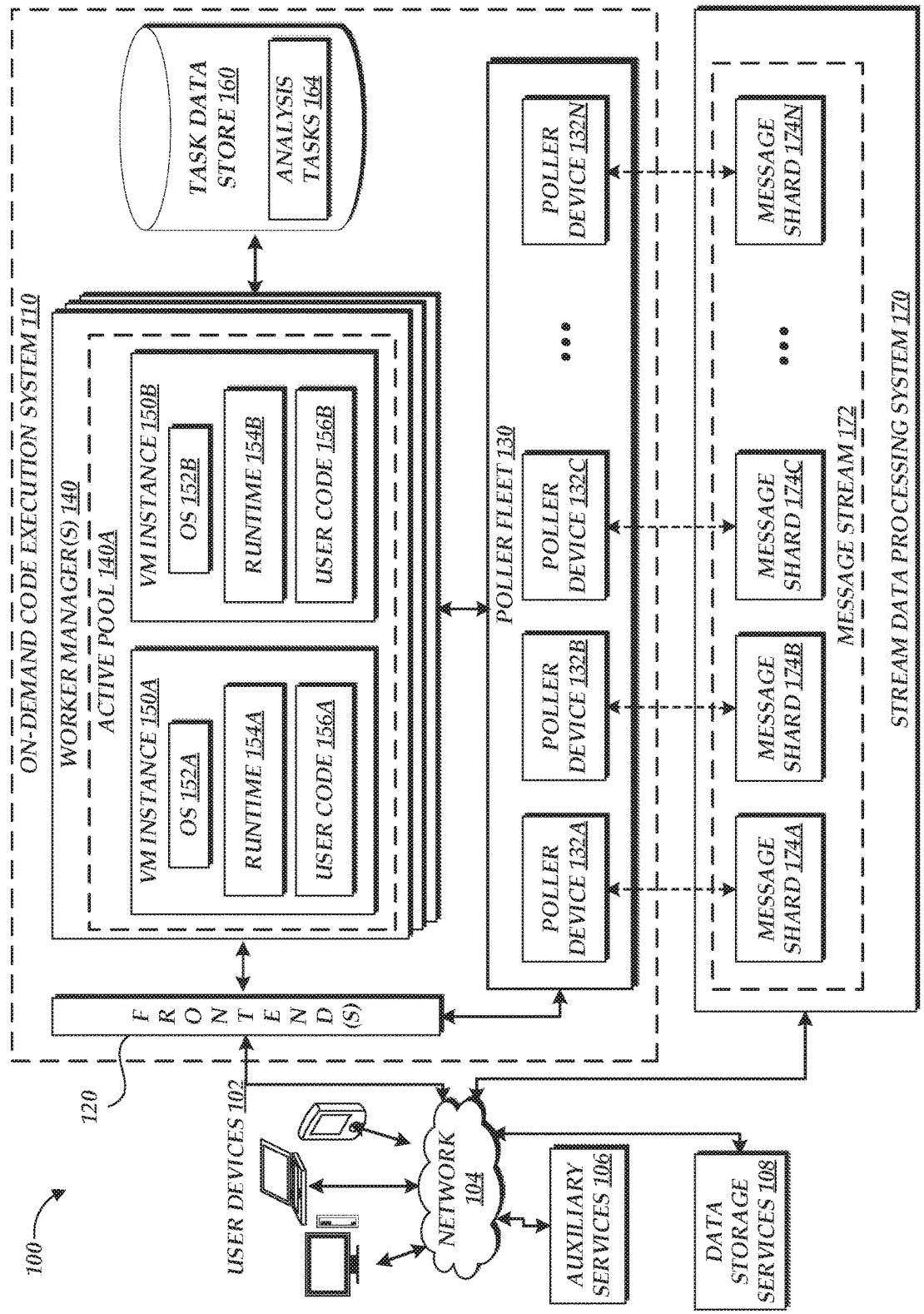
FIG. 1 is a block diagram depicting an illustrative environment in which an on-demand code execution system can operate to process data sets by utilizing polling devices to maintain state information for processing the data sets, such that individual execution environments within the on-demand code execution system are not required to maintain state information.

Generally described, aspects of the present disclosure relate to an on-demand code execution environment that enables clients to request execution of user-defined code in order to process a set of data. More specifically, aspects of the present disclosure enable processing of a set of data statefully, without requiring that state information be maintained in the execution environments in which code executes. In the context of data set processing, stateful processing generally refers to processing in which a result of processing a later data item in a set depends at least partly on retained state information related to previously processed data items, as opposed to stateless processing, which operation does not depend on retained state information. Stateful processing may be utilized, for example, to implement the MapReduce programming model, such as by counting a number of occurrences of a particular data item in a set. While stateful processing is often desirable to end users, successful and resilient implementation of stateful processing can present challenges to distributed systems. Typically, such processing is implemented by code that stores state information locally, such that processing of a later data item can be based on the locally stored state information. However, local storage of state information inhibits portability of code executions, as each data item in a data set must be routed to an environment that contains the correct state information. Local storage of state information also creates additional requirements for resiliency of execution environments, as a loss of the state information can place analysis of a data set into an indeterminate state. For these and other reasons, many systems that might otherwise be desirable to use for stateful processing, such as on-demand code execution systems (sometimes called "serverless" compute systems) do not generally support stateful code execution. The embodiments disclosed herein address these problems, by providing for stateful processing within execution environments without requiring local storage of state information within those environments.

For ease of illustration, embodiments of the present disclosure are described with reference to implementation of the MapReduce programming model, which can be used to analyze large data sets, and which generally relies at least in part on stateful code to "reduce" outputs of an initial "map" stage of the model. As is known in the art, the MapReduce programming model is a logical data processing model used to enable a distributed computing system (e.g., including multiple distinct devices in communication with one another) to process data sets, and particularly large data sets (e.g., on the order of gigabytes, terabytes, petabytes, etc.). Generally, the MapReduce programming model includes at least two data processing stages: a map stage and a reduce stage. During the map stage, individual devices within the distributed computing system collect a portion of the data set (e.g., chunks of n gigabytes) and "map" the content of the portion into a set of outputs. Each set of outputs is then processed by a "reduce" function to aggregate, combine, or otherwise determine a result of processing the content within the output set. A common example of the MapReduce paradigm is that of counting the occurrence of words within a corpus. For example, suppose that a user obtains a multi-terabyte textual data set, and would like to determine what words exist within the data set and how often each word occurs. Utilizing a single device, processing the data set may take excessive amounts of time. However, under the MapReduce model, each device within a distributed system may process a limited portion (or "chunk") of the data set according to a map function. In this example, the map function may correspond to counting the occurrence of each word within the portion of the data set. By increasing the number of devices within the system, the speed of processing can be increased. The limitation of such processing is that each device would process only a limited portion of the data set, and thus be aware only of a count of words within that portion. To aggregate the counts across devices, a reduce function is used. While it may be possible to use a single device to aggregate the word counts generated at each map function, this configuration once again creates a bottleneck to processing. To address this, the MapReduce model enables multiple reduce functions to be implemented across the distributed system, each function processing a subset of the outputs of the map functions, according to an attribute of the outputs. For example, in the example of a word count, 26 reduce functions may be implemented, each creating a count of words starting with a particular character in the English alphabet. Illustratively, a first reduce function may obtain, from the map functions, all counts of words starting with the letter 'a,' a second reduce function may obtain all counts of words starting with 'b,' etc. Each reduce function can therefore gain an overall word count for a certain portion of the words in the corpus. The outputs of the reduce function can be combined to obtain the total word count. Often, combining the outputs of a reduce function is a relatively low-cost operation, as those outputs are distinct and non-overlapping. Thus, the MapReduce programming model can be utilized to facilitate rapid, distributed processing of data sets.

As will be appreciated in light of the above, a reduce stage of the MapReduce model is often implemented statefully, as a result of processing an nth data item in a data set generally depends on a result of processing the (n−1)th data item. To provide for stateful reduce stages, the MapReduce model has traditionally been implemented on dedicated distributed systems, configured with framework software that handles the generation and configuration of worker computer nodes within the system. Use of dedicated worker nodes provides, among other potential advantages, an affinity between worker nodes and the portions of the data set on which they implement the reduce stage. Each worker node can be provided with an appropriate portion of the output of a map stage, thus ensuring accurate implementation of the reduce stage with respect to that portion. However, traditional MapReduce implementations also have disadvantages. For example, worker nodes are commonly dedicated solely to implementation of the MapReduce model, limiting their ability to undertake other computing tasks. Establishing such a distributed system can therefore be time consuming and inefficient, particularly where a user does not require a continual, dedicated system for implementation of the MapReduce model.

Embodiments of the present disclosure address the above-noted issues by enabling typically stateful processing, such as the reduce stage of the MapReduce programming model, to be implemented within stateless execution environments, such as those provided by an on-demand code execution system. As will be described in more detail below, embodiments of the present disclosure enable an intermediary device to maintain state information related to iterative data processing (e.g., a reduce stage of the MapReduce model), and to submit the state information in each request to execute code on an on-demand code execution system. The intermediary device can obtain updated state information in response to each call, and include the updated state information in a next call. In this manner, execution environments on the on-demand code execution system are relieved of an obligation to maintain state information, and may continue to operate statelessly. However, state information can nevertheless be maintained while processing a set of data, enabling successful stateful analysis of data sets. As will be described below, the intermediary device may be configured to ensure resiliency of operation, such that failures within a system processing a data set can be identified and corrected. Moreover, the intermediary device can be configured to ensure efficient resiliency, such that providing resiliency does not have a substantial negative impact on the ability of the system to processes the data sets.

In one embodiment, the intermediary device is a poller device, which operates to retrieve a set of calls to invoke code on an on-demand code execution system (e.g., to process a data item included or referenced in the call), and to pass each call to the on-demand code execution system. The set of calls can be illustratively maintained as a queue, such as a message queue on a stream data processing system. Illustratively, a poller device in accordance with embodiments of the present disclosure may determine initial state information for processing data items on the queue (e.g., as a null state), retrieve an initial batch of calls from the queue, and iteratively submit each call to the on-demand code execution system along with current state information representing a state of processing of the queue. The poller device can be configured to receive in response to each call updated state information, which information can be included within subsequent calls. Because the state information for the queue is passed in each call, environments on the on-demand code execution system are not themselves required to maintain state information. For this reason, no affinity is generally required between a poller device and an environment in which a call is processed. Rather, the on-demand code execution system can route calls from the poller device to any suitable environment, increasing flexibility of the on-demand code execution system in executing code corresponding to the call. The poller device can be configured to periodically save the state information to a resilient storage system (e.g., a network storage location with built-in redundancy), and to resume processing based on that saved state information in the event of a failure. Thus, maintaining state information at a poller device provides an efficient mechanism for enabling stateful data processing at an on-demand code execution system.

While other mechanisms for enabling stateful data processing at an on-demand code execution system are contemplated herein, these other mechanisms are generally less desirable than maintaining state information at an intermediary (e.g., poller) device. For example, it is conceivable that an on-demand code execution system is configured to provide affinity for multiple calls to execute a given set of code, such that each call is routed to the same execution environment. It is further conceivable that the on-demand code execution system enables each such environment to maintain local state information, thus enabling stateful execution of code within the environment. However, this approach significantly decreases flexibility of operation of the on-demand code execution system, requiring that the system maintain execution environments for long periods of time. Moreover, this approach may not be well suited to address issues that frequently arise in distributed processing systems, such as the need to provide resiliency of operation or the need to scale up or down a number of environments in response to changing operational load. For example, to address these issues, the on-demand code execution system may be required to frequently save state information of each environment, significantly increasing resource usage of the system. The system may also be required to provide for transferring of state information between environments during scale up or scale down events, increasing the complexity of managing such environments. Another possible mechanism for retaining state information between processing of calls is to configure each execution environment, during processing of a call, to write its state information to a persistent external location, such as network data storage. Thus, subsequent executions may retrieve the state information from the persistent location to facilitate processing of subsequent calls. However, in distributed systems, writing to an external storage location is generally considered a "heavy weight" operation, as it can significantly increase the computing resources used to process a call. For example, writing to a network location may require initiation of a transport control protocol (TCP) session with the network location, a process that can take significant time and resources (in terms of the resources that would otherwise be required to process a single call). Where the number of calls is large (e.g., when processing multi-terabyte data sets), the additional overhead required for such a heavy weight operation can be significant.

Embodiments of the present disclosure enable state information to be maintained between processing of calls without these drawbacks. For example, an intermediary device can pass state information for a call at the same time that the call is submitted to an on-demand code execution system, and can receive updated state information as a response to that call. Thus, no additional network communications are required by the on-demand code execution system. Moreover, the intermediary device can implement provide resiliency by saving state information periodically, at a periodicity that can be adjusted based on the resources available to the device and overhead required to resume operation in the event of a failure. Specifically, because the intermediary device is capable of a "long term" view of processing of a queue of calls, the device is not required to ensure state information is saved after each call, as the on-demand code execution system or an external data store might be.

The on-demand code execution system, as described in detail herein, may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("AN") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

Because the on-demand code execution system can provide the ability to execute a task on-demand, without configuration of an underlying device on which to execute the code, the on-demand code execution system can provide an excellent platform on which to implement the MapReduce programming model. For example, as described in U.S. patent application Ser. No. 16/144,997, entitled "MAPREDUCE IMPLEMENTATION IN AN ON-DEMAND NETWORK CODE EXECUTION SYSTEM AND STREAM DATA PROCESSING SYSTEM" and filed Sep. 27, 2018 (the "'997 Application"), which application is hereby incorporated by reference in its entirety, the on-demand code execution system may be used in conjunction with a stream data processing system to implement the MapReduce programming model without requiring a centralized controller. The present disclosure can further improve operation of the on-demand code execution system to implement the MapReduce programming model or other data analysis by providing an efficient way of maintaining state information for such data analysis, without requiring that such state information be maintained within environments of the on-demand code execution system or persisted by such environments to additional external locations.

As will be appreciated by one of skill in the art in light of the present disclosure, the embodiments disclosed herein improves the ability of computing systems, such as on-demand code execution systems, to process and analyze data sets in a parallelizable manner. More specifically, embodiments of the present disclosure enable state information to be efficiently maintained between code executions on on-demand code execution systems, without requiring that such state information be maintained in an execution environment of the systems. Moreover, the presently disclosed embodiments address technical problems inherent within computing systems; specifically, the need to maintain state information when statefully processing data sets, and the difficulty of maintaining such information without increasing computing resources used to process the data set or decreasing flexibility in where such processing occurs. These technical problems are addressed by the various technical solutions described herein, including the use of an intermediary device to retrieve calls to an on-demand code execution system from a queue and to iteratively submit the calls to the on-demand code execution systems while maintaining state information passed with the calls. Thus, the present disclosure represents an improvement on existing data processing systems and computing systems in general.

The general execution of tasks on the on-demand code execution environment will now be discussed. Specifically, to execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the on-demand code execution system 110 to implement desired functionality on behalf of a user. Auxiliary services 106 can correspond to network-connected computing devices, such as servers, which generate data accessible to the on-demand code execution system 110 or otherwise communicate to the on-demand code execution system 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. As described below, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to retrieve a set of data to be analyzed, and store information (e.g., results) regarding that analysis. The network-based data storage services 108 may represent, for example, a relational or non-relational database. In another example, the network-based data storage services 108 may represent a network-attached storage (NAS), configured to provide access to data arranged as a file system. Various other functionalities may be included within network-based data storage services 108 usable within embodiments of the present disclosure. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The illustrative environment 100 further includes a stream data processing system 170. As discussed above, the stream data processing system can provides the ability for upstream devices to place data onto a message stream 172, such as by publishing "messages" onto the stream 172, which may be designated based on a specific "topic." While a single stream 172 is shown in FIG. 1, the system 170 may provide multiple streams on behalf of multiple parties. The system 170 can make messages within the stream 172 available to downstream devices, often in a "first-in-first-out" ("FIFO") or nearly FIFO order. In some instances, the stream data processing system 170 "pushes" messages to downstream devices. In other instances, downstream devices "pull" messages from the message stream 172 on request. Generally, the stream data processing system 170 is configured to provide resiliency, such that data successfully published to the stream is unlikely to be lost due to failures of devices of the stream data processing system 170. For example, the system 170 may duplicate messages placed onto the stream 172 onto multiple computing devices used to implement the stream (e.g., physical computing devices or virtual devices implemented on physical hosts). Moreover, the stream data processing system 170 can be configured to provide parallelization of the devices that maintain the message stream 172. For example, a user configuring a message stream may designate a partition key for the stream, used to divide the stream into sub-streams, each sub-stream handled by one or more parallelized devices. The sub-streams are shown in FIG. 1 as message shards 174A-N. Each message shard 174 can generally represent one or more computing devices configured to obtain and make available a subset of messages on the message stream, selected by the system 170 according to the partition key and a volume of messages on the stream 170 (e.g., such that additional shards are created, or excess shards are destroyed, based on a capacity of the shards 174 to service messages on the stream 172). Examples of stream data processing systems known in the art include the AMAZON™ KINESIS™ network service and the APACHE™ KAFKA™ system.

The user computing devices 102, auxiliary services 106, network-based data storage services 108, and stream data processing system 170 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 and stream data processing system 170 are depicted in FIG. 1 as operating in a distributed computing environment including several computer systems that are interconnected using one or more computer networks (not shown in FIG. 1). Either or both of the on-demand code execution system 110 and stream data processing system 170 could also operate within a computing environment having a fewer or greater number of devices than are illustrated in FIG. 1. Thus, the depiction of the on-demand code execution system 110 and stream data processing system 170 in FIG. 1 should be taken as illustrative and not limiting to the present disclosure. For example, the on-demand code execution system 110 and stream data processing system 170 or various constituents thereof could implement various Web services components, hosted or "cloud" computing environments, and/or peer to peer network configurations to implement at least a portion of the processes described herein.

Further, the on-demand code execution system 110 and stream data processing system 170 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 and stream data processing system 170 are illustrated as connected to the network 104. In some embodiments, any of the components within the on-demand code execution system 110 and stream data processing system 170 can communicate with other components of the on-demand code execution system 110 and stream data processing system 170 via the network 104. In other embodiments, another network (such as a private network not shown in FIG. 1) may enable communication between components within each of the on-demand code execution system 110 and stream data processing system 170 or between those systems.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, the tasks established by a user may correspond to code executable to implement a "reduce" function with respect to a data set, or other function which aggregates, combines, or otherwise determines a result based on the data set as a whole.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

In accordance with embodiments of the present disclosure, user-submitted code may correspond to an analysis function for a set of data. The function may be embodied in computer-executable code, represented by one or more analysis tasks 164 on the on-demand code execution system 110. In one embodiment, an analysis task 164 implements a reduce stage of the MapReduce programming model. The specific functionalities of a reduce stage in such a model may vary according to the data to be processed. However, in general terms, a reduce function corresponds to code to "reduce" or aggregate multiple intermediate results to an aggregate result. For example, an initial map function may correspond to code to process a corpus of words (e.g., a book or a collection of books) and generate a count of individual words (or, in some instances, specific classes of words, such as surnames) within the corpus. A corresponding reduce function can correspond to code that aggregates the counts of individual words, as produced by individual executions of the map function. Illustratively, a reduce function may take one thousand intermediate count data files, as produced by one thousand instances of the map function, and generate a single data file aggregating the counts of each word within the one thousand intermediate count data files. Where only a single reduce function is executed, the single data file can represent the result of the analysis. Where multiple reduce functions are executed, resulting in multiple outputs (each aggregating counts of words within a set of inputs), an additional reduce function can process those multiple outputs to further aggregate word counts. This process can continue until single reduce function is called, resulting in a single output file as the result of the analysis. Alternatively, each of multiple reduce functions may write output to a common location (e.g., a database) as a final output of the analysis.

Because analysis functions are often specific to the data to be processed, code corresponding to these functions may be provided by an end user requesting analysis of a corresponding data set. In some instances, the on-demand code execution system 110 may also provide one or more sets of corresponding analysis functions (e.g., corresponding to commonly desired analysis types and configured to process data within an expected format).

To enable storage of tasks, the on-demand code execution system 110 may include a task data store 160, which may correspond to a persistent or substantially persistent data store, such as a hard drive (HDD), a solid state drive (SDD), network attached storage (NAS), a tape drive, or any combination thereof. In accordance with embodiments of the present disclosure, the task data store may include one or more analysis tasks 164.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an auxillary service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution environment, such as the active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

The on-demand code execution system 110 further includes one or more worker managers 140 that manage the execution environments, such as virtual machine instances 150 (shown as VM instance 150A and 150B, generally referred to as a "VM"), used for servicing incoming calls to execute tasks, and that manage the memory states of execution environments. While the following will be described with reference to virtual machine instances 150 as examples of such environments, embodiments of the present disclosure may utilize other environments, such as software containers. In the example illustrated in FIG. 1, each worker manager 140 manages an active pool 140A, which is a group (sometimes referred to as a pool) of virtual machine instances 150 executing on one or more physical host computing devices that are initialized to execute a given task (e.g., by having the code of the task and any dependency data objects loaded into the instance). The active pool 140A illustratively is implemented using primary memory (e.g., RAM) of host devices implementing or under control of the worker manager 140.

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. As another example, the tasks of the group may share common dependencies, such that an environment used to execute one task of the group can be rapidly modified to support execution of another task within the group.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. In some instances, each VM 150 may be associated with additional information, such as state information, maintained across individual executions of a task. For example, when initially created, a VM 150 may initialize the OS 152, and each time the user code 156 is executed in the VM 150, a state of the VM 150 may change. State of a VM 150 may be maintained, for example, within registers of a virtual CPU of the VM 150, within RAM of the VM 150, within a virtual disk drive of the VM 150, or the like. In accordance with embodiments of the present disclosure, analysis tasks 164 may be executed across a data set without requiring state to be maintained in a VM 150, even if the VM 150 is configured to enable such state information to be maintained. Beneficially, this may enable a call to execute an analysis task 164 to be routed to any available VM 150, rather than a VM 150 at which appropriate state information is stored.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106, network-based data storage services 108, or the stream data processing system 170.

To facilitate interaction with auxiliary services 106, the system 110 including a polling fleet 130, which operates to poll auxiliary services 106, data storage services 108, or the stream data processing system 170 for data. Illustratively, the polling fleet 130 may include one or more computing devices (shown in FIG. 1 as poller devices 132A-N) configured to periodically transmit a request to the auxiliary services 106, data storage services 108, or stream data processing system 170 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106, data storage services 108, or the stream data processing system 170, the type or content of the data, or timing information corresponding to the data. In some instances, the auxiliary services 106, data storage services 108, or stream data processing system 170 may function to notify the frontend 120 of the availability of new data, and thus the polling fleet 130 may be unnecessary with respect to such services.

In accordance with embodiments of the present disclosure, a message stream 172 can be configured to store calls to process data items within a data set. Illustratively, each message on the messages stream may correspond to a call to execute an analysis task 164 with respect to an individual data item within the data set. Messages may be distributed among the shards 174A-N based on a partition key for the message stream 172, which key may be represented by or included within the data item of the message. In one embodiment, messages are placed onto the message stream 172 via operation of a map stage of a MapReduce model. Example embodiments for operation of such a map stage are discussed in the '997 Application, incorporated by reference above. In another embodiment, messages are placed on the stream 172 via other mechanisms, such as during operation of devices generating the data to be analyzed (e.g., in "real time").

As shown in FIG. 1, the poller fleet 130 can be configured to include a dynamic number of poller devices 132A-N (e.g., implemented as virtual machine instances on an underlying computing system), based on the number of message shards 174 within a message stream 172. For example, as shown by the dotted lines of FIG. 1, message shard 174A may correspond to poller device 132A, message shard 174B may correspond to poller device 132B, etc. Thus, as the number of message shards 174 changes (e.g., due to volume of the message stream), the number of poller devices 132 may also change. As such, the poller fleet 130 may be in communication with stream data processing system 170, and the system 170 may notify the poller fleet 130 of changes to the message shards 174. In such a configuration, each poller device 132A can be configured to poll a message shard 174 to retrieve messages in the sub-stream corresponding to the message shard. The messages may be retrieved individually or in batches (e.g., batches of 10 messages, 50 messages, 100 messages, 500 messages, etc.). Thereafter, the poller device 132 may invoke a call to an analysis task 164 to process each message, which call includes state information for a current state of processing messages within the shard 174 corresponding to the poller device 132. On receiving a result of execution of the analysis task 164 to process the message, the device 132 may update its state information, which information the device 132 may then submit with subsequent calls. In one embodiment, a call to the analysis task 164 may be made for each individual message. In another embodiment, a call to the analysis task 164 may be made for each batch of messages, with a batch size matching or differing from the batch size for retrieval of messages from the message shard. In some instances, the call from each poller device 132 to an analysis task 164 execution may be made synchronously, such that the poller device 132 waits for confirmation that the execution was successful prior to making a next call. Use of synchronous calls may beneficially rate-limit calls to the reduce task, such that a generally one-to-one correspondence is maintained between the number of poller devices 132 and analysis task 164 executions.

While some functionalities are generally described herein with reference to an individual component of the on-demand code execution system 110 or the stream data processing system 170, other components or a combination of components may additionally or alternatively implement such functionalities. For example, while a poller device 132A may operate to poll a message shard 174 for messages, the message shards 174 may additionally or alternatively be configured to notify the on-demand code execution system 110 (e.g., the frontend) of new messages on the shard 174.

Figure 2:
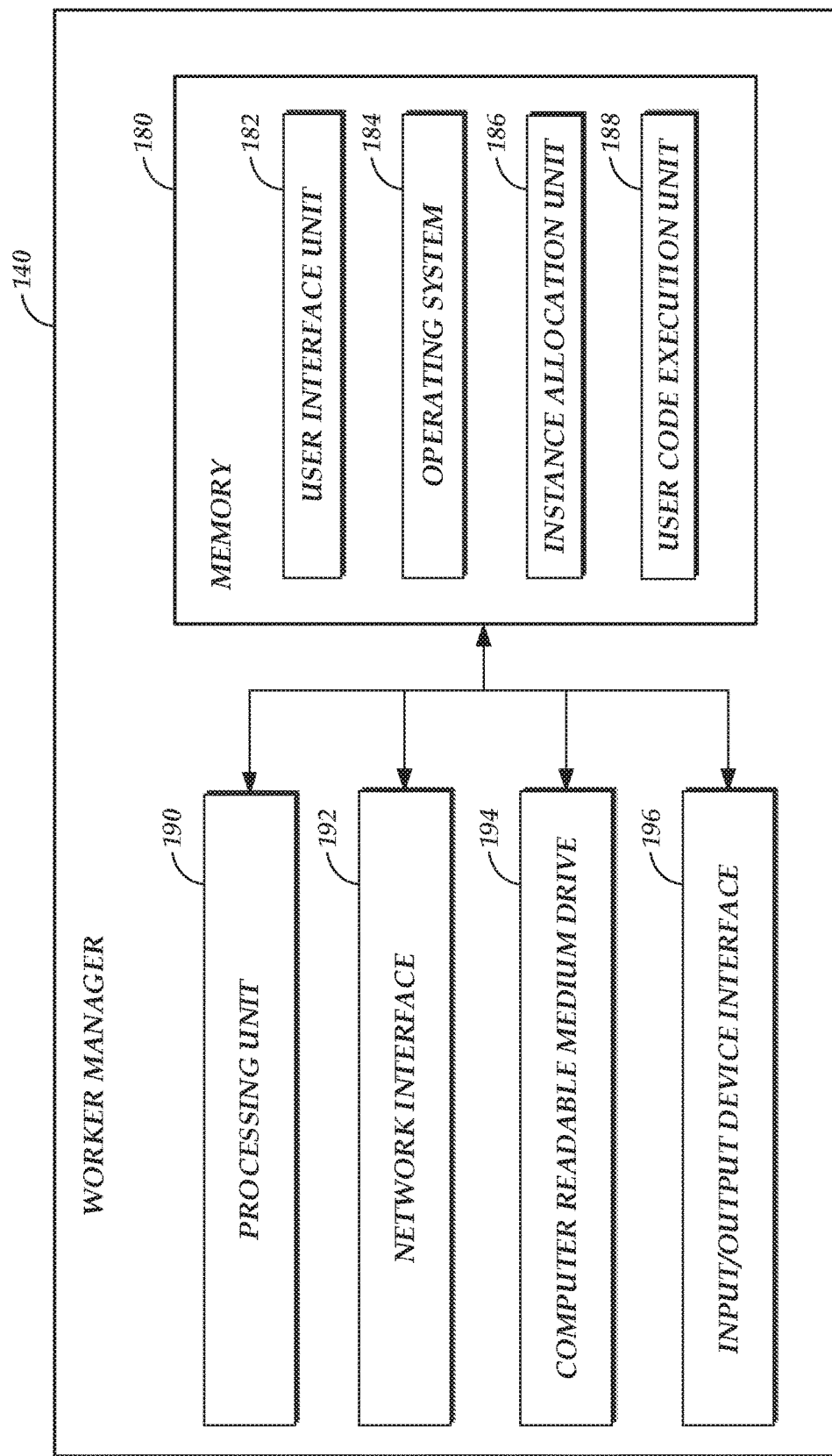
FIG. 2 depicts a general architecture of a computing device providing a worker manager of FIG. 1.

FIG. 2 depicts a general architecture of a computing system (referenced as worker manager 140) that manages the virtual machine instances in the on-demand code execution system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute user code. For example, the instance allocation unit 186 identifies a virtual machine instance and/or a container that satisfies any constraints specified by the request and assigns the identified virtual machine instance and/or container to the user or the request itself. The instance allocation unit 186 may perform such identification based on the programming language in which the user code is written. For example, if the user code is written in Python, and the instance allocation unit 186 may find n virtual machine instance (e.g., in the active pool 140A of FIG. 1) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

Figure 3:
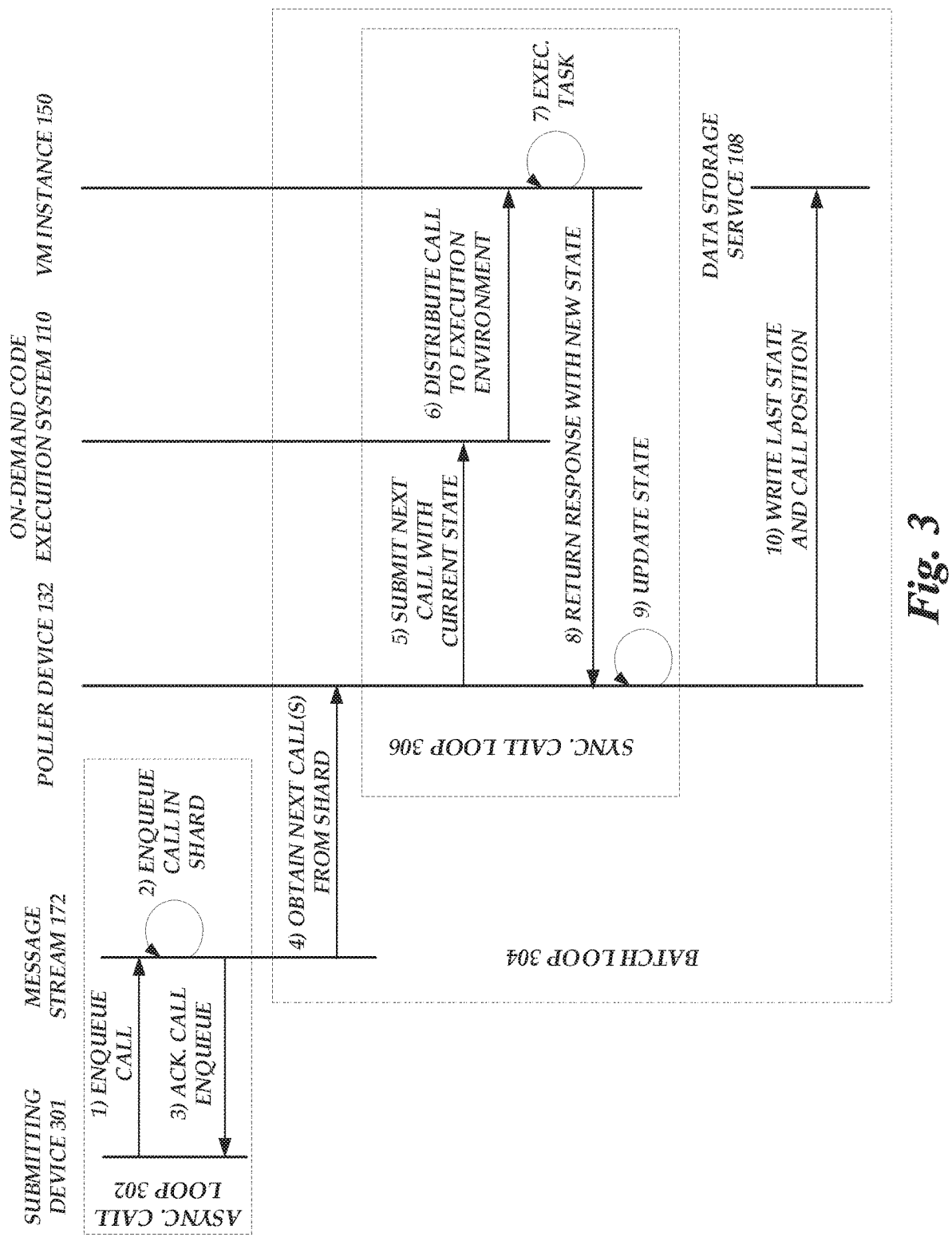
FIG. 3 is a flow diagram depicting illustrative interactions for utilizing polling devices to maintain state information for processing the data sets via execution of code within execution environments of the on-demand code execution system of FIG. 1.

With reference to FIG. 3, illustrative interactions are depicted for analyzing a set of data items via execution of an analysis task 164 on an on-demand code execution system 110 while maintaining state information for such an analysis at a poller device 132. In one embodiment, the interactions of FIG. 3 are illustrative of those that may be undertaken by the system 110 to implement a reduce stage of a MapReduce programming model.

The interactions of FIG. 3 begin at (1), where a submitting device 301 enqueues a call to the analysis task 164 on the message stream 172. The submitting device 301 can generally correspond to any device, any may include a user device 102, a device of an auxiliary service 106, a device of the on-demand code execution system 110, etc. For example, a submitting device 301 may be a device of the on-demand code execution system 110 that has executed a map function. As another example, a submitting device 301 may be an end user device submitting data to be analyzed via the analysis function. The enqueued call generally includes a data item to by analyzed as part of a data set, which data set is represented by the calls on the message stream 172. In some instances, the enqueued call may be an explicit call to invoke an analysis task 164, such as by identifying the analysis task 164. In other instances, the enqueued call may not be an explicit call, but may instead simply pass a data item, which nevertheless results in a call to the analysis task 164 to process the data item due to configuration of the stream 172, on-demand code execution system 110, or both.

At (2), the message stream 172 (e.g., the stream data processing system 170 hosting the message stream 172) enqueues the call onto an appropriate shard 174 of the stream 172. As discussed above, the particular shard onto which the call is placed may depend for example on a partition key for the stream 172 as applied to the data item of the call. For example, the stream data processing system 170 may implement a consistent hashing mechanism (examples of which are known in the art) to select a shard 174 onto which to place the call based on an attribute of the data item which has been designated as a partition key for the stream 172. At (3), the stream 172 acknowledges to the submitting device 301 that the call has been enqueued.

In FIG. 3, Interactions (1) through (3) represent an asynchronous call loop 302, which may be repeated any number of times to enqueue additional calls onto the stream 172. The loop 302 is designated as relating to asynchronous calls, as acknowledgements to each enqueuing are passed asynchronously with respect to actual implementation of the call. Thus, the interactions of asynchronous call loop 302 may occur independent of other interactions. For example, while the interactions of loop 302 are shown in FIG. 3 as prior to other interactions, these interactions may be repeated at least partially concurrently to other interactions. Moreover, the interactions may be repeated by a number of different submitting devices 301. Thus by repetition of interactions (1)-(3), a number of calls (e.g., each pertaining to a data item of a data set to be analyzed) may be enqueued onto the message stream 172.

Interactions (4) through (10) are illustrative of those which might occur to process calls from an individual shard 174 of the message stream 172 via submission of those calls to the on-demand code execution system 110. While interactions (4) through (10) are described with respect to a particular shard 174 and poller device 132, these interactions may be repeated (e.g., by different poller devices 132 operating at least partially in parallel) to process calls of each shard 174.

Specifically, at (4), a poller device 132 obtains one or more next calls from a shard 174 of the stream 172. In some instances, the poller device 132 may obtain a single call from the shard 174. In other instances, the poller device 132 may obtain multiple calls, such as a next 10, 100, or 500 calls of the shard 174. For ease of reference, the one or more next calls are referred to herein as a "batch" of calls. Thus, interactions (4) through (10) are designated in FIG. 3 as batch loop 304. These interactions may be repeated, for example, while calls exist within a given shard 174.

As noted above, the shards 174 illustratively operated in a generally (and potentially strictly) first-in, first-out ("FIFO") manner. Thus, while interactions (1) through (3) conceptually enqueue calls in a "back" of a shard 174, interaction (4) obtains calls from the "front" of the shard 174.

Thereafter, the poller device 132 enters a synchronous call loop 306, during which individual calls from a received batch are passed to the on-demand code execution system 100 for processing, and state information reflecting that processing is maintained at the poller device 132. Specifically, at (5), the poller device 132 submits a next, not-yet-processed call within a current batch to the on-demand code execution system (e.g., to the frontend 120). Illustratively, in a first instance of the loop 306, the submitted call may be the first call enqueued into the shard 174. The call may be submitted via any submission process accepted by the system 110, such as via an API call. Thereafter, at (6), the system 110 distributes the call to an execution environment, shown in FIG. 3 as a VM instance 150, in which code of an analysis task 164 is executed in order to process the call. The analysis task 164 is then executed within the environment at (7), and a result of that execution is returned to the poller device 132 at (8).

To facilitate execution of the analysis task 164, at interaction (5), the poller device 132 submits to the on-demand code execution system 110, in addition to the call, state information reflecting a current state of processing of data items within the shard 174. The poller device 132 may initialize the state information to a null value. Thus, a first call to the on-demand code execution system 110 may include the null value, or may exclude the state information. The result of the task execution, as returned at (8), can include new state information, as updated to reflect the task execution. At (9), the poller device 132 updates its current state information with the new state information (e.g., by replacing it's own state information with the new state information), which updated state information can then be passed in a next call, if interaction (5) is repeated.

As a concrete example of interactions (5) through (10), consider an implementation of the MapReduce model intended to count words within a corpus. In such a scenario, each call within a particular shard 174 may include a word of the corpus as a data item. The poller device 132 may initially set state information to a null value, indicating that no words have been counted for the shard 174. As each call is submitted to the on-demand code execution system 110, an execution environment may return state information reflecting current count values (e.g., initially null) incremented based on a word within the current call. Thus, a first call with a data item of "apple" may result in state information of "{apple: 1}", indicating that a current count of the word "apple" is "1." A second call may include that state information, and call for processing of the word "ball." Execution of the analysis task 164 with respect to this call may result in state information of "{apple: 1; ball: 1}." This process may continue, such that the state information returned by each task execution is representative of processing each call within a shard 174 of the stream. While a simplistic word count example is provided herein, one skilled in the art will appreciate that data analysis applications, in practice, may encompass a variety of highly complicated analysis.

In FIG. 3, loop 306 is designated as a synchronous call loop, indicating that in these illustrative interactions, a response to each call to the system 110 is received only after execution of the analysis task 164 completes, and includes results of that execution. For example, interactions (5) and (8) may represent an HTTP call and response, respectively, and thus be referred to as a "synchronous HTTP request." Use of synchronous requests may beneficially reduce the computing resources needed to pass state information between a poller device 132 and an execution environment, since such state information can be passed within a request and response that the on-demand code execution system 110 would provide in any case. Thus, for example, no additional network connections are needed at an execution environment in order to pass state information of a task execution to the poller device 132. However, in some embodiments, it is contemplated that asynchronous calls could also be utilized by a poller device 132. For example, the poller device 132 may submit an asynchronous request to the system 110 to process a call from the shard 174, and a task execution may cause an execution environment to initiate communication with the poller device 132 to return state information for the task execution.

In some embodiments, such as where data analysis depends on an ordering of the calls of the message stream 172, the call loop 360 may occur strictly iteratively, such that each call must be submitted to the system 110, and a result received, before the poller device 132 submits a next call to the system 110. In other instances, a poller device 132 may implement the call loop 306 at least partially in parallel, such as by submitting multiple calls to the system 110 concurrently.

As will be appreciated in view of the above, interactions (5) through (9) generally do not rely on any specific distribution of a call by the on-demand code execution system 110 to a particular execution environment. For example, each instance of call loop 306 may result in a call be distributed to a different execution environment. Beneficially, this configuration enables environments to operate statelessly, such that they need not maintain any information regarding a state of processing of the message stream 172. Stateless operation may enable the on-demand code execution system 110 to operate more efficiently, by distributing calls to environments based, for example, on computing resources available to such an environment, rather than based on whether the environment has appropriate state information. In this manner, overall efficiency is improved relative to alternative state maintenance solutions.

As discussed above, it is generally desirable that distributed systems operate resiliently, such that a failure of one or more devices in the system does not significantly impact operation of the system as a whole. In the present model, it is assumed that the message stream 172 operates resiliently under most failure scenarios, such as by providing redundant storage of messages enqueued on a message stream. It is similarly assumed that the system 110 as a whole operates resiliently under most failure scenarios, such as by providing multiple execution environments on different physical devices. It is generally not necessary that each execution environment guarantee resiliency, as a poller device 132 can be configured to retry any failed calls to execute an analysis task 164, which the system 110 may illustratively distribute to a different (non-failed) environment. Indeed, it may be desirable to make little or no effort to provide resiliency of individual execution environments on the system 110, as providing resiliency generally increases the computing resources required to provide such environments.

Given the assumed resiliency of the message stream 172 and the on-demand code execution system, it may be desirable for the poller device 132 to also operate resiliency, such that a data analysis task can proceed even under a wide variety of failure scenarios. To provide such resiliency, the poller device 132 may periodically or occasionally write current state information, reflecting a state of processing a shard 174 of a stream 172, to a resilient data store, such as a network data storage service 108. It is generally desirable for such writes to occur as infrequently as feasible, as these writes are often "heavy weight" operations. In the illustrative interactions of FIG. 3, a write is shown to occur at interaction (10), at the end of the batch loop 304. Thus, as the poller device 132 processes each batch of calls, state information reflecting processing of that batch (and any prior batches) can be written to the data storage service 108. The state information illustratively also reflects a last call processed by the poller device 132. The last call may be designated, for example, with reference to a location in a shard 174 of the stream 172.

Should the poller fleet 130 detect that a poller device 132 has failed, a new poller device 132 may be created, and initialized with the latest state information written to the data storage service 108. The new poller device 132 may then retrieve a next batch of calls (e.g., the next messages of a shard 174 that are not reflected in the state information as having been processed), effectively resuming operation of the failed poller device 132 and providing resilient operation of the poller devices 132. Because the frequency of writes to the data storage service 108 can be controlled based on a number of calls in each instance of the batch loop 304 (a "batch size"), operation of the poller device 132 may be tuned (e.g., by an administrator or end user) based on desired operation. For example, a large batch size might result in less frequent external writes, reducing computing resource usage of the poller device 132, but increasing the amount of calls that would need to be repeated under a failure scenario. Conversely, a small batch size might result in more frequent external writes, but reduce the calls repeated under failures. In either instance, embodiments of the present disclosure enable this tradeoff to be selected independently from operation of other components, such as the on-demand code execution system 110.

A beneficial aspect of the stream data processing system 170 described herein is an ability to scale a capacity of a message stream 172 based on the volume of messages therein, thus enabling variability in the amount of parallelization for a data analysis task, even during operation of the data analysis. For example, an increased amount of calls being enqueued onto a message stream 172 may cause the number of shards 174 of the stream to increase, thus increasing capacity of the stream 172. Conversely, a decreased amount of calls may cause the number of shards 174 to decrease. As poller devices 132 can be configured with a one-to-one correspondence with shards 174, poller devices 132 may be configured to transfer state information appropriately under these conditions to prevent interruption of data analysis. Example illustrations of how state information may be passed between poller devices 132 are show in FIGS. 4 and 5.

Figure 4:
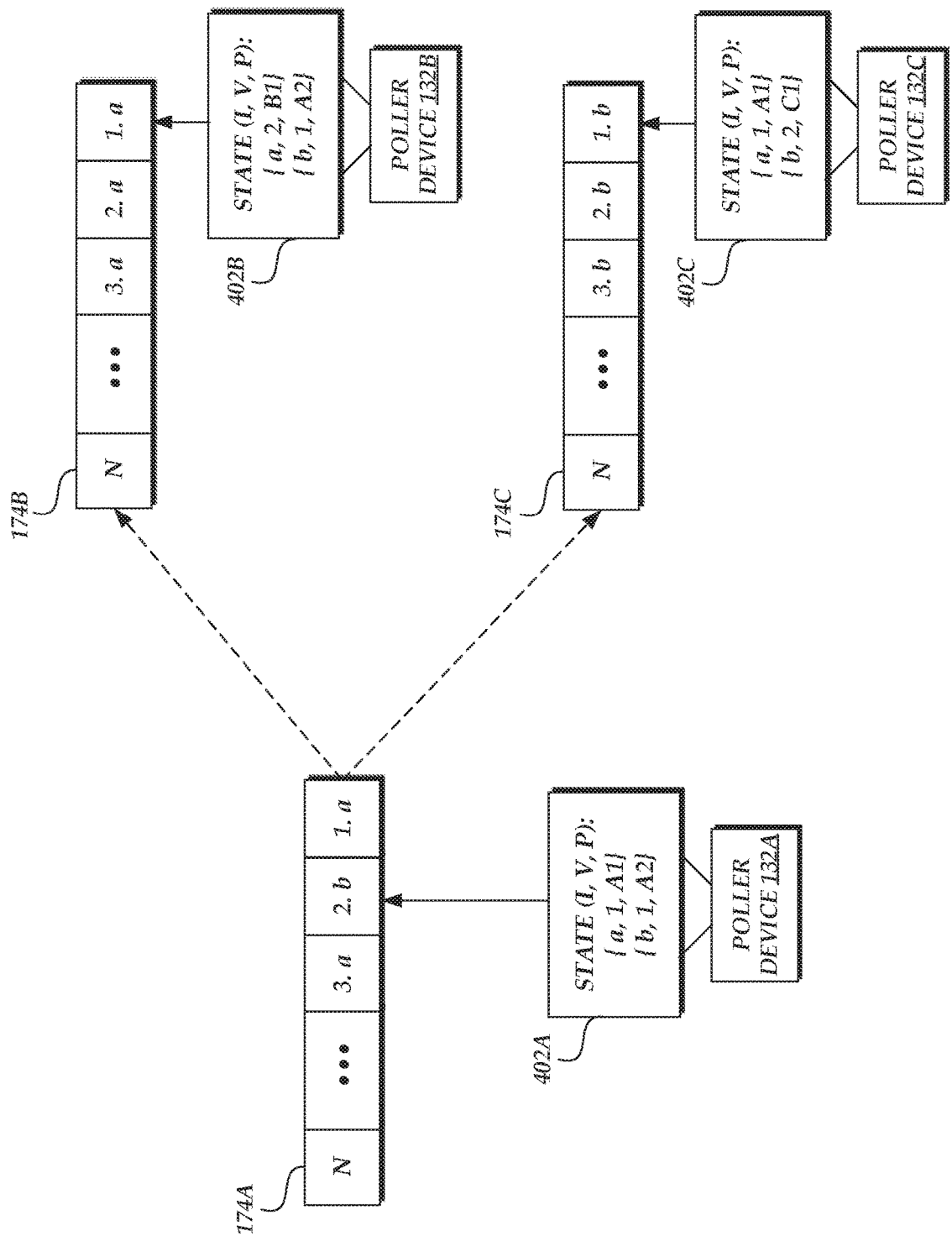
FIG. 4 is a diagram graphically depicting transfer of state information between poller devices of FIG. 1 during a redistribution of devices processing a data set, and specifically to enable splitting of a set of data items into multiple subsets that may each be processed independently.

Specifically, FIG. 4 depicts how state information may be transferred from a first poller device 132A, corresponding to a first shard 174A, in the instance that the shard 174A "splits" into two new shards, shard 174B and 174C, respectively. For ease of illustration, it will be assumed that shards 174A-C in FIG. 4 reflect calls to a data analysis task to count the frequency of data items within a data set. It will further be assumed (for simplicity's sake) that the data set consists of the characters "a" and "b" in a repeated pattern: "a, b, a, b, a, b," etc. The initial shard 174A is assumed to initially be the sole shard of a stream 172, until the stream 172 is split into the two shards 174B and 174C. In this illustrative example, the character of the data set is selected as a partition key for the stream 172. Thus, shard 174B contains a series of the character "a," and shard 174C contains a series of the character "b." It is illustratively desirable for analysis of the data set to maintain an accurate count of these characters as the stream 172 is processed. Thus, for example, the first message of the stream 172—message number 1 of shard 174A—should result in a count of 1 for the character "a." The second message of the stream 172—message number 2 of shard 174A—should result in a count of 1 for the character "a" and 1 for the character "b," etc.

In FIG. 4, state information 402 for each poller device 132 is shown above the respective poller device 132, subsequent to processing (e.g., via an analysis task 164) of the message in the respective shard 174 pointed to by the state information. Thus, state information 402A shows state information maintained at the poller device 132A after processing of message number 2 on shard 174A. The state information of FIG. 4 is depicted as a three-value tuple, including an identifier ("I") of the data item being analyzed, a value (e.g., a count) of the data item, and a position within the message stream 172 at which the value of the data item was last modified. Thus, in FIG. 4, the state 402A of the poller device 132 after processing message 2 of shard 174 is that the data item 'a' has been counted '1' time, with the last count being made at "A1," representing the first message of shard 174A, and that data item 'b' has been counted '1' time, with the last count being made at "A2," representing the first message of shard 174A.

In FIG. 4, it is assumed that after processing of message number 2 of shard 174A, the shard splits into shards 174B and 174C. Thus, message 1 of shard 174B represents what was initially message 3 of shard 174A, message 1 of shard 174C represents what was initially message 4 of shard 174A, etc. It is assumed that each poller device 132 has a one-to-one correspondence with a shard 174. Thus, if poller devices 132B and 132C were to initialize with null state information, their current state information would not accurately reflect a state of the stream 172 with respect to those data values included in their respect shards 174. That is, poller device 132B might hold state information indicating that the 'a' on message 1 of shard 174B is the first 'a' in the stream 172, when in fact it is the second.

To address this scenario, each poller device 132 can be configured, on halting of the shard 174 corresponding to the device, to make their current state information available to poller devices 132 corresponding to "child" shards 174. Illustratively, each poller device 132 can be configured to write their state information to a data storage service 108. On initializing, each poller device 132 can be configured to determine whether a corresponding shard 174 is a child of a prior shard 174. Illustratively, the stream data processing system 170 may make this information available to the poller fleet 130. If the poller device 132 corresponding to a child shard 174, the poller device 132 can be configured to initialize as its state information the saved state information of the poller device 132 corresponding to the parent shard 174. Thus, in FIG. 4, each of poller devices 132B and 132C have been initialized, prior to processing messages of their respective shards 174B and 174C, with the state information 402A of poller device 132A, as it existed when operation of poller device 132A last processed a message of the stream 172. For that reason, the state information 402B of poller device 132B reflects that, as of message 1 of shard 174B, a total count of 2 is assigned to the character 'a'. Similarly, the state information 402C of poller device 132C reflects that, as of message 1 of shard 174C, a total count of 2 is assigned to the character 'b.' The state information of the respective devices 132B and C thus reflects an accurate state with respect to those data items partitioned to the shard 174 to which they correspond.

As may be seen in FIG. 4, in addition to accurate values for data items partitioned to the respective shards 174, the state information for poller devices 132B and C also includes outdated state information with respect to those data items not partitioned to the respective shards 174. For example, the state information 402B reflects a value of '1' for data item 'b,' even though the shard 174B has been partitioned from the stream 172 such that data item 'b' is not included within the shard 174B. Similarly, the state information 402C reflects a value of '1' for data item 'a,' even though the shard 174C has been partitioned from the stream 172 such that data item 'a' is not included within the shard 174C.

This redundancy is addressed by configuring the poller devices 132, or any other device wishing to obtained overall results of processing the calls in a stream 172, to deduplicate the values reflected in state information of various poller devices 132. Specifically, because each data item tuple includes a last location in the stream 172 at which a value for the data item was updated, deduplication can occur by designating a latest location tuple as authoritative for the data item.

Figure 5:
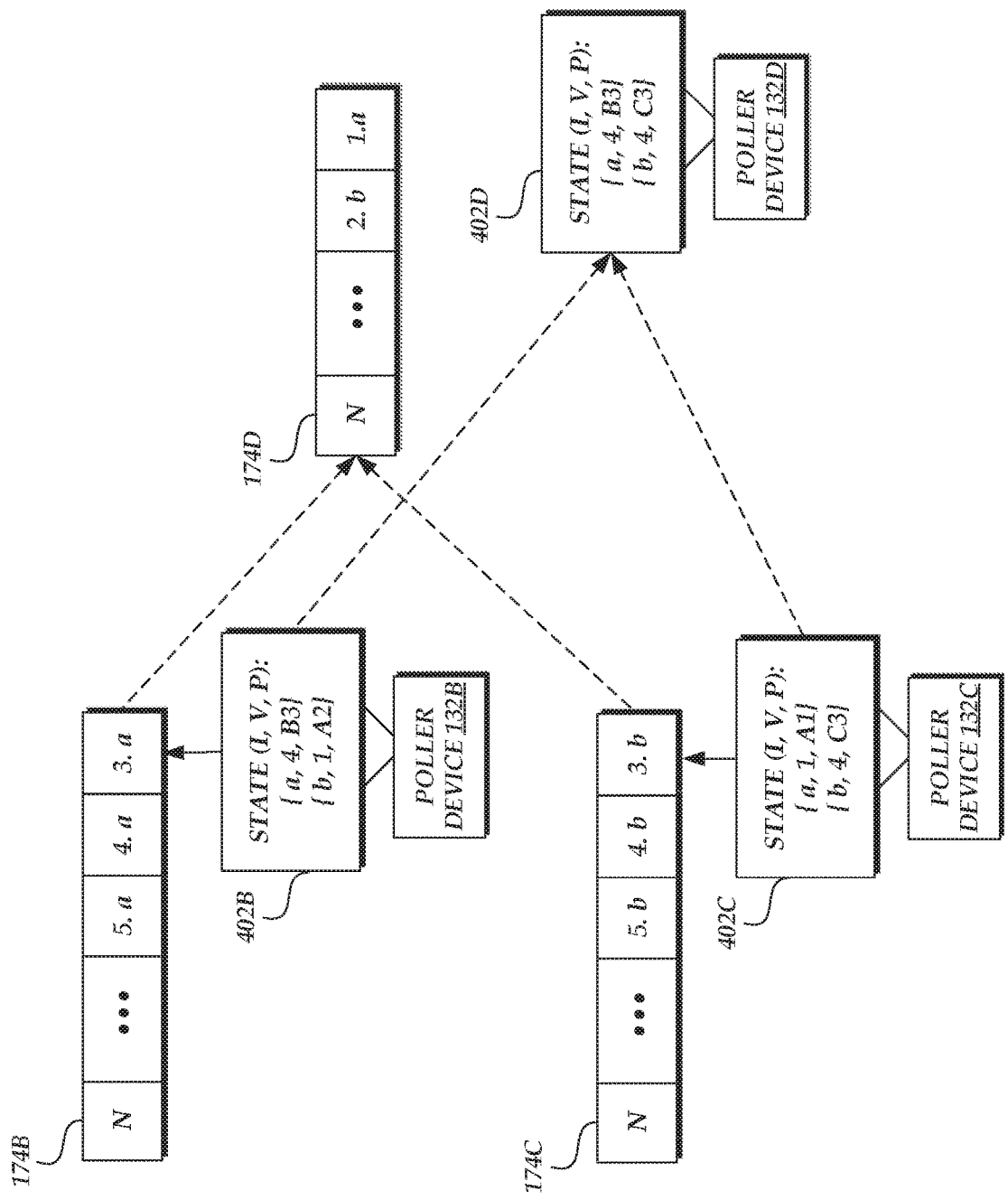
FIG. 5 is a diagram graphically depicting transfer of state information between poller devices of FIG. 1 during a redistribution of devices processing a data set, and specifically to enable merging of multiple sets data items into a single super set.

An illustrative example of deduplicating state information is depicted in FIG. 5. Similarly to FIG. 4, FIG. 5 depicts illustrative state information for poller devices 132B and 132C, reflecting processing of calls on respective shards 174B and C, each corresponding to a data item in a stream 172. In FIG. 5, each of poller devices 132B and 132C are assumed to have facilitated processing of additional messages on their respective shards 174, and the state information 402B and C is thus reflective of processing the third message on those respective shards 174.

The illustration of FIG. 5 depicts how state information from multiple devices 132 may be combined, in the instance that two shards 174 are merged into a single shard 174. Specifically, in FIG. 5, shard 174A and 174B are depicted as being merged into the shard 174D, which shard 174D can be considered a child of shards 174A and 174B. As noted in FIG. 4, at halting of their respective shards 174, each of poller devices 132B and 132C can be configured to pass their state information to the poller device 132D corresponding to the child shard 174D. However, due to the interactions described above, the state information 402B and 402C contains redundant information, with two potential values for each data item 'a' and 'b.'

To eliminate the redundant information, the poller device 132D is configured to deduplicate the state information received for each parent shard, by taking as authoritative state information with a latest positional value in the message stream 172, as reflected in FIG. 5 by the third value of each data item tuple. Thus, when comparing two tuples for data item 'a', one from state information 402B with a positional value of 'B3' (or message 3 of shard B) and one from state information 402C with a positional value of 'A1,' the poller device 132D determines that the state information 402B is authoritative for data item 'a,' because shard 174B is a child of shard 174A, and thus a later position in the stream 172. The poller device 132D can illustratively receive ancestry data from the stream data processing system 170, if required, to determine relationships between shards 174 of the stream 172. Through a similar process, the poller device 132D can determine that state information 402C is representative of a value for data item 'b.' Thus, the state information 402D reflects a deduplicated, accurate record of the counts for both data items as of the initialization of shard 174D.

While simplified examples are described above, one skilled in the art will appreciate in view of the present disclosure that the sharing of state information between polling devices 132, and deduplication of such information, can facilitate any number of modifications to the number of shards 174 of a stream 172, while enabling a polling device 132 to maintain accurate values at least with respect to data items partitioned to their corresponding shard 174. Moreover, while one technique for deduplicating state information is discussed above, others are contemplated within the present disclosure. For example, in circumstances where a value of a data item is known to only change in a single direction (e.g., a count that can only increase), duplicative values for the data item may be deduplicate by assuming as authoritative a furthest value in that direction (e.g., a largest count). In this way, deduplication can occur without requiring a position for each value to be maintained. As another example, in addition or as an alternative to position information within a shard, other ordering information may be included for individual data items being processed. For example, state information may include an absolute position identifier across a message stream (e.g., across multiple shards), or may include timestamp information corresponding to an ordering messages. The timestamp information may include, for example, a time at which a message was enqueued into the message stream. Thus, a higher timestamp value for state information may identify that the state information represents a state of processing a later message within the message stream, and can be considered authoritative over state information representing a state of processing an earlier message in the message stream.

Figure 6:
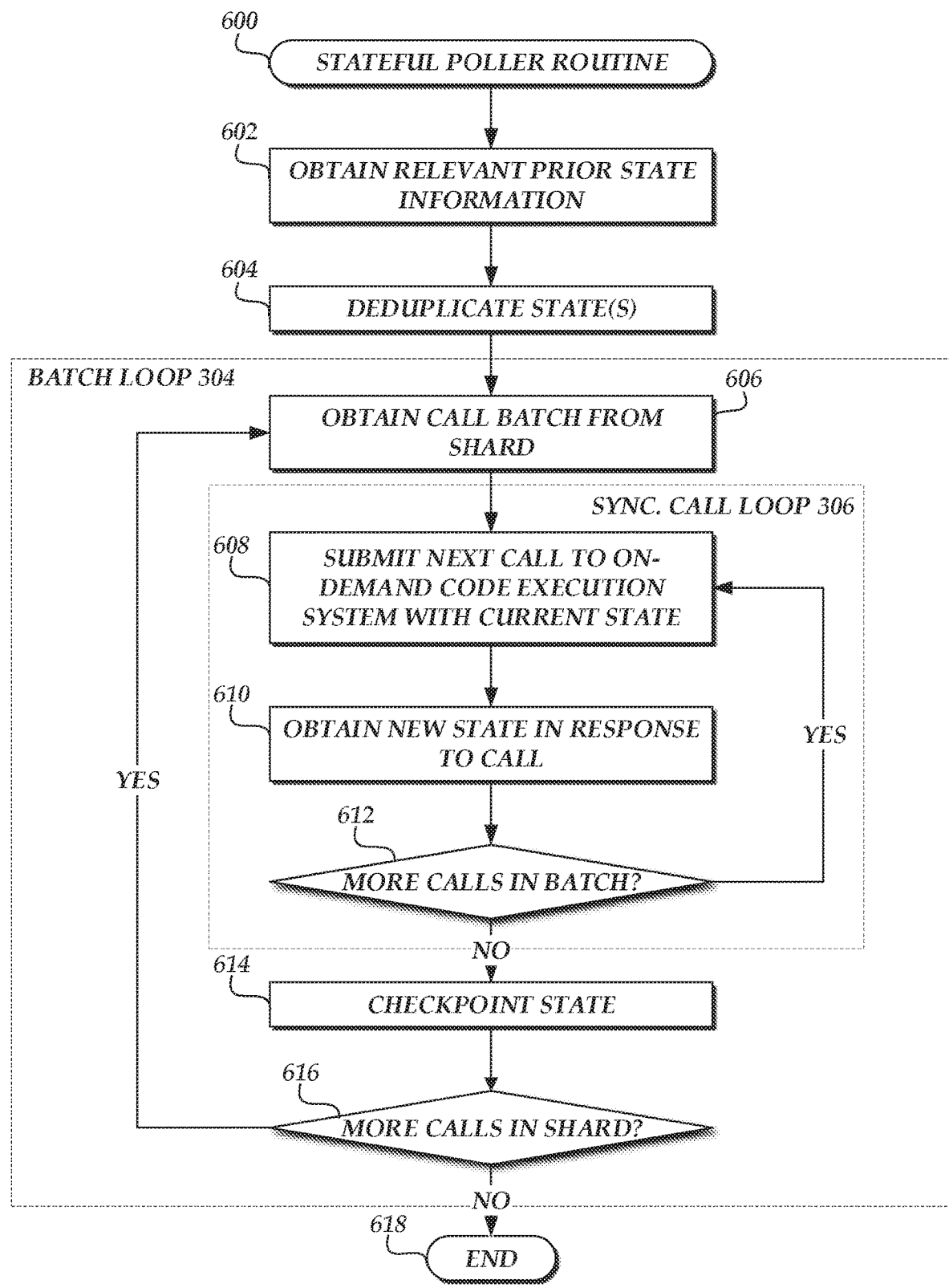
FIG. 6 is an illustrative routine for utilizing polling devices to maintain state information for processing the data sets via execution of code within execution environments of the on-demand code execution system of FIG. 1.

With reference to FIG. 6, a block diagram will be described depicting an illustrative routine 600 for maintaining at a poller device 132 state information reflecting a state of processing of messages on a message stream 172 (e.g., calls identifying data items) representing a data set. The routine 600 may illustratively be implemented at the poller device 132 corresponding to a shard 174 of the message stream 172.

The routine 600 begins at block 602, where the poller device 132 obtains relevant prior state information related to the shard 174. Illustratively, if a prior poller device 132 was processing the shard 174 and failed, the current poller device 132 may obtain the state information of the prior poller device 132, and resume processing the shard 174 from a last position reflected in the state information of the prior poller device 132. As a further illustration, if the shard 174 is a child of one or more prior shards 174, the poller device 132 may obtain and adopt state information for poller devices 132 corresponding to parents of the shard 174. Illustratively, on initialization, the poller device 132 may query the stream data processing system 170 to identify whether the shard 174 has any parent shards 174. If so, the poller device 132 may obtain state information for those parent shards 174, such as from data storage service 108. If no parent shards 174 exist, the poller device 132 can initialize state information to a null value or predefined values established on configuration of the device 132.

At block 604, the poller device 132 deduplicates the state information of the parent shards, if any duplicative information exists. As noted above, deduplication may include taking as authoritative for a given data item a value associated with a furthest position in the message stream 172.

At block 606, the poller device 132 enters batch loop 304, as described above with reference to FIG. 3, and obtains a batch of calls from the shard 174 at block 606. Each call can correspond to a message enqueued in the shard 174 and identify or include a data item from a data set to be analyzed. The number of calls retrieved at block 606 may vary according to a desired frequency of the batch loop 304. Illustratively, a batch of calls may include 500 calls.

At block 608, the poller device 132 enters the synchronous call loop 306, and submits a next call from a current batch to the on-demand code execution system 110, along with the current state information maintained at the poller device 132. As noted above, passing of the state information enables the call to be routed by the system 110 to any appropriate execution environment. The call may be submitted, for example, as a synchronous HTTP request.

At block 610, the poller device 132 obtains a response to the call, including new state information. The new state information illustratively represents the state information passed within the call, as updated by execution of an analysis task 164 on the on-demand code execution system 110. The poller device 132 may thus consider the new state information authoritative, as reflecting a state of processing of data items identified in the shard.

At block 612, the routine 600 returns to block 608 if additional calls exist within the batch that have not been submitted to the on-demand code execution system. Alternatively, the routine 600 proceeds to block 614. At block 614, the poller device 132 checkpoints its state, such as by writing the current state information to a resilient network data storage service. As noted above, should the poller device 132 fail during implementation of the routine 600, a subsequent poller device 132 may utilize the state information to resume processing of the shard 174.

At block 616, the routine 600 returns to block 606 if additional calls exist within the shard 174. Alternatively, if all calls within the shard have been processed, processing of the shard can be considered complete, and the last written state information of the poller device 132 will be representative of processing of all data items on the shard 174. Thus, the routine 600 may end at block 618.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for maintaining state information representing a state of processing messages enqueued within a message stream, the system comprising:
   a stream data processing system maintaining the message stream, wherein individual messages within the message stream corresponding to calls to invoke user-specified code to process individual data items within a data set;
   an on-demand code execution system configured to obtain the calls to invoke the user-specified code and, for individual requests, to select execution environments of the on-demand code execution system in which to execute the user-specified code; and
   a poller device comprising a processor and memory and configured with computer-executable instructions to:
      initialize the state information representing the state of processing messages enqueued within the message stream;
      retrieve from the message stream a plurality of messages; and
      for each message in the plurality of messages:
         transmit to the on-demand code execution system the state information representing the state of processing messages enqueued within the message stream and the call corresponding to the message, wherein the call requests invocation of the user-specified code to process an individual data item identified by the message;
         receive a response to the call including a result of processing the individual data item, wherein the result of processing the individual data item is based at least partly on the state of processing messages enqueued within the message stream; and
         update the state information based at least partly on the response to cause the state information, as updated based at least partly on the response, to be transmitted to the on-demand code execution system in conjunction with a subsequent call.

2. The system of claim 1, wherein the on-demand code execution system is further configured to implement a plurality of executions of a map task that enqueue the individual messages within the message stream as a map stage of a MapReduce programming model, and wherein the user-specified code implements a reduce stage of the MapReduce programming model.

3. The system of claim 1, wherein the message stream is divided into a plurality of message shards, wherein individual messages within the message stream are distributed among the plurality of message shards according to the data items, wherein the poller device corresponds to a first shard of the plurality of shards from which the plurality of messages is retrieved, and wherein the state information is representative of a state of processing messages within the first shard.

4. The system of claim 3 further comprising a second poller device configured with computer-executable instructions to:
   initialize second state information representing a state of processing messages enqueued within a second message shard of the plurality of shards;
   retrieve from the second message shard a second plurality of messages; and
   for each message in the second plurality of messages:
      transmit to the on-demand code execution system the state information representing the state of processing messages enqueued within the second message shard and the call corresponding to the message, wherein the call requests invocation of the user-specified code to process an individual data item identified by the message;
      receive a response to the request including a result of processing the individual data item, wherein the result of processing the individual data item is based at least partly on the state of processing messages enqueued within the second message shard; and
      update the second state information representing the state of processing messages enqueued within the second message shard based at least partly on the response received at the second poller device to cause the second state information, as updated based at least partly on the response received at the second poller device, to be transmitted to the on-demand code execution system in conjunction with a subsequent call by the second poller device.

5. A computer-implemented method comprising:
   initializing state information representing a state of processing messages enqueued within a message stream, wherein individual messages within the message stream correspond to calls to execute user-specified code on an on-demand code execution system to process individual data items within a data set;
   retrieving from the message stream a plurality of messages; and
   for each message in the plurality of messages:
      transmitting to the on-demand code execution system the state information representing the state of processing messages enqueued within the message stream and the call corresponding to the message, wherein the call requests invocation of the user-specified code to process an individual data item identified by the message;
      receiving a response to the call including a result of processing the individual data item, wherein the result of processing the individual data item is based at least partly on the state of processing messages enqueued within the message stream; and
      updating the state information based at least partly on the response to cause the state information, as updated based at least partly on the response, to be transmitted to the on-demand code execution system in conjunction with a subsequent call.

6. The computer-implemented method of claim 5, wherein initializing the state information comprises retrieving one or more past instances of state information from a data store and initializing the state information based at least partly on the one or more past instances of state information.

7. The computer-implemented method of claim 6, wherein the message stream is divided into a plurality of message shards, and wherein the one or more past instances of state information include state information from a failed device.

8. The computer-implemented method of claim 6, wherein the message stream is divided into a plurality of message shards, wherein the plurality of messages is retrieved from a first shard of the plurality of message shards, and wherein the one or more past instances of state information include state information from a device processing messages enqueued within one or more parent shards to the first shard.

9. The computer-implemented method of claim 8, wherein the one or more parent shards comprise at least two parent shards, and wherein the computer-implemented method further comprises deduplicating state information of the at least two parent shards.

10. The computer-implemented method of claim 9, wherein the state information of the at least two parent shards indicate, for individual data items in the state information of the at least two parent shards, last positions in the messages stream at which values for the individual data items were modified.

11. The computer-implemented method of claim 5 further comprising, subsequent to receiving responses for each call corresponding to each message in the plurality of messages, writing the state information to a data store.

12. The computer-implemented method of claim 11 further comprising detecting a failure in a device implementing at least part of the computer-implemented method and retrieving the state information from the data store to resume implementation of the at least part of the computer-implemented method.

13. Non-transitory computer-readable media comprising computer-executable instructions that, when executed by a computing system, cause the computing system to:
    initialize state information representing a state of processing messages enqueued within a message stream, wherein individual messages within the message stream correspond to calls to execute user-specified code on an on-demand code execution system to process individual data items within a data set;
    retrieve from the message stream a plurality of messages; and
    for each message in the plurality of messages:
        transmit to the on-demand code execution system the state information representing the state of processing messages enqueued within the message stream and the call corresponding to the message, wherein the call requests invocation of the user-specified code to process an individual data item identified by the message;
        receive a response to the call including a result of processing the individual data item, wherein the result of processing the individual data item is based at least partly on the state of processing messages enqueued within the message stream; and
        update the state information based at least partly on the response to cause the state information, as updated based at least partly on the response, to be transmitted to the on-demand code execution system in conjunction with a subsequent call.

14. The non-transitory computer-readable media of claim 13, wherein a synchronous hypertext transport protocol (HTTP) request is used to transmit to the on-demand code execution system the state information and the call.

15. The non-transitory computer-readable media of claim 14, wherein the response is an HTTP response to the HTTP request.

16. The non-transitory computer-readable media of claim 14, wherein the user-specified code executes on the on-demand code execution system statelessly, without reference to state information maintained on the on-demand code execution system independently of calls to execute the user-specified code.

17. The non-transitory computer-readable media of claim 13, wherein to initialize the state information, the computer-executable instructions cause the system to retrieve one or more past instances of state information from a data store and initialize the state information based at least partly on the one or more past instances.

18. The non-transitory computer-readable media of claim 13, wherein the message stream is divided into a plurality of message shards, and wherein the one or more past instances of state information include state information from a failed device.

19. The non-transitory computer-readable media of claim 13, wherein the message stream is divided into a plurality of message shards, wherein the plurality of messages is retrieved from a first shard of the plurality of message shards, and wherein the one or more past instances of state information include state information from a device processing messages enqueued within one or more parent shards to the first shard.

20. The non-transitory computer-readable media of claim 19, wherein the one or more parent shards comprise at least two parent shards, and wherein the non-transitory computer-readable media further comprises computer-executable instructions executable by the computing system to deduplicate the state information of the at least two parent shards.

21. The non-transitory computer-readable media of claim 19, wherein the computer-executable instructions cause the system to transmit a first request corresponding to a first message of in the plurality of messages and a second request corresponding to a second message in the plurality of messages to the on-demand code execution system concurrently.

* * * * *

UNITED STATES PATENT AND TRADEMARK OFFICE
CERTIFICATE OF CORRECTION

Page 1 of 2

PATENT NO. : 11,099,917 B2
APPLICATION NO. : 16/144905
DATED : August 24, 2021
INVENTOR(S) : Hussels et al.

It is certified that error appears in the above-identified patent and that said Letters Patent is hereby corrected as shown below:

On the Title Page

On Page 5, Column 1, Item (56), Line 74, under U.S. PATENT DOCUMENTS, delete "Thibeault" and insert --Thibeault et al.--.

On Page 8, Column 2, Item (56), Line 7, under Other Publications, delete "US/2017/" and insert --US2017/--.

On Page 8, Column 2, Item (56), Line 9, under Other Publications, delete "US/2017/" and insert --US2017/--.

On Page 8, Column 2, Item (56), Line 27, under Other Publications, delete "bl ogs" and insert --blogs--.

On Page 8, Column 2, Item (56), Line 28, under Other Publications, delete "processi ng made-si mple" and insert --processing-made-simple--.

On Page 8, Column 2, Item (56), Line 28, under Other Publications, delete "mapred uce" and insert --mapreduce--.

In the Specification

In Column 6, Line 29, delete "("AN")" and insert --("API")--.

In Column 14, Line 63, delete "(SDD)," and insert --(SSD),--.

In Column 21, Line 20, delete "(1)-)(3)," and insert --(1)-(3),--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*

In the Claims

In Column 32, Claim 21, Line 46 (Approx.), before "in the plurality" delete "of".